(12) United States Patent  (10) Patent No.: US 7,163,100 B2
Dickinson et al.  (45) Date of Patent: Jan. 16, 2007

(54) RECIPROCATING FLOOR STRUCTURE (75) Inventors: Larry C. Dickinson, Apex, NC (US); Paul W. Peterson, Jr., Cary, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 0 days.

(21) Appl. No.: 11/294,310

(22) Filed: Dec. 5, 2005

(65) Prior Publication Data

US 2006/0118391 A1  Jun. 8, 2006

Related U.S. Application Data (60) Provisional application No. 60/633,717, filed on Dec. 6, 2004.

(51) Int. Cl.
*B65G 25/04* (2006.01)

(52) U.S. Cl. .................................. 198/750.4; 198/750.3

(58) Field of Classification Search ............. 198/750.1, 198/750.2, 750.3, 750.4, 750.5; 414/525.1
See application file for complete search history.

(56) References Cited

U.S. PATENT DOCUMENTS

| | | | | |
|---|---|---|---|---|
| 4,962,848 A * | 10/1990 | Foster | ................... | 198/750.2 |
| 5,145,309 A * | 9/1992 | Foster | ................... | 198/750.2 |
| 5,228,556 A * | 7/1993 | Quaeck | ................... | 198/750.3 |
| 5,234,309 A * | 8/1993 | Foster | ................... | 198/750.2 |
| 5,301,798 A * | 4/1994 | Wilkens | ................. | 198/750.3 |
| 5,355,994 A * | 10/1994 | Foster | ................... | 198/750.2 |
| 5,794,402 A | 8/1998 | Dumlao et al. | | |
| 6,023,806 A | 2/2000 | Dumlao et al. | | |
| 6,044,607 A | 4/2000 | Dumlao | | |
| 6,070,378 A | 6/2000 | Dumlao | | |
| 6,081,955 A | 7/2000 | Dumlao et al. | | |
| 6,108,998 A | 8/2000 | Dumlao | | |
| 6,467,118 B1 | 10/2002 | Dumlao et al. | | |
| 6,645,333 B1 | 11/2003 | Johnson et al. | | |
| 6,651,806 B1 * | 11/2003 | Hallstrom | ............... | 198/750.3 |
| 6,676,785 B1 | 1/2004 | Johnson et al. | | |

\* cited by examiner

*Primary Examiner*—James R. Bidwell
(74) *Attorney, Agent, or Firm*—Barnes & Thornburg LLP (57) ABSTRACT

Slats and a supporting structure for a reciprocating floor located on a surface of a base are provided. The slats may be constructed of ultra high molecular weight materials. The slats may be configured to be retained on the surface of the base.

20 Claims, 6 Drawing Sheets

Fig. 7

RECIPROCATING FLOOR STRUCTURE

RELATED APPLICATIONS

This application claims the benefit, under 35 U.S.C. § 119(e), of U.S. Provisional Patent Application Ser. Nos. 60/633,717 filed Dec. 6, 2004 which is hereby incorporated by reference herein in its entirety.

FIELD OF THE DISCLOSURE

The present disclosure relates generally to reciprocating floors of the type having a number of reciprocating floor slats.

BACKGROUND

Reciprocating floors are used in trucks, trailers, warehouses, loading docks, and other material handling facilities to facilitate the movement of cargo. A reciprocating floor typically has a plurality of reciprocating floor slats which are coupled to a number of drive beams. The drive beams are driven by a drive actuator. The drive actuator typically includes a number of independently-controlled hydraulic cylinders which are operated to move the drive beams (and hence the floor slats) in a predetermined sequence thereby moving the cargo in a desired direction.

SUMMARY

A system of reinforced slats for a reciprocating floor includes a plurality of first slats, a plurality of second slats, a base and a drive mechanism. The first slats and second slats may slide on the base. The system may further comprise a plurality of guides secured to the base. The first slats may mate with the guides retaining the first slats against the base. The first slats may include a flange along the longitudinal sides of the first slat. The slat may be configured to retain the second slats. The second slats may include a projection along both of the longitudinal sides of the second slat. The projection may be configured to be retained by the flange of the first slat. When assembled, the guide secured to the base may retain the first slat, the first slat may retain the second slat, and the first and second slats may be free to move longitudinally on the surface of the base independent of one another. In other embodiments, the first and seconds slats may otherwise intermesh such that the first slat retains the second slat against a support surface and allowing the first and second slats to move independently along their longitudinal axes.

The slats may be driven by the drive mechanism. The drive mechanism may be configured to move a plurality of slats independently from the remaining slats. The drive mechanism may be configured to sequentially move multiple groups of slats. The drive mechanism may be configured to move all of the slats in unison.

The slats may be made of an ultra high molecular weight material such as ultra high molecular weight polyethylene. Such a material may be self-lubricating. The slats may be made of a reinforced composite material. The slats may be made of metal. The slats may have an irregular shape on the bottom surface to reduce the contact area of the bottom surface of the slat to the base.

The base may be made of a composite material, metal, wood, concrete, or other material capable of supporting the load borne by the reciprocating floor. The base may be a combination of materials such as wood and metal. The base may have a wear resistant surface preparation. The base may have holes located therein to allow fluid or other materials to pass therethrough and into a fluid reservoir.

The reciprocating floor may be installed on a chassis, loading dock, or warehouse floor. The reciprocating floor may be remotely operated by the operator. A drain for the fluid reservoir may be remotely opened by an operator.

BRIEF DESCRIPTION OF THE DRAWINGS

The detailed description particularly refers to the accompanying figures in which.

DETAILED DESCRIPTION OF THE DRAWINGS

Figure 1:
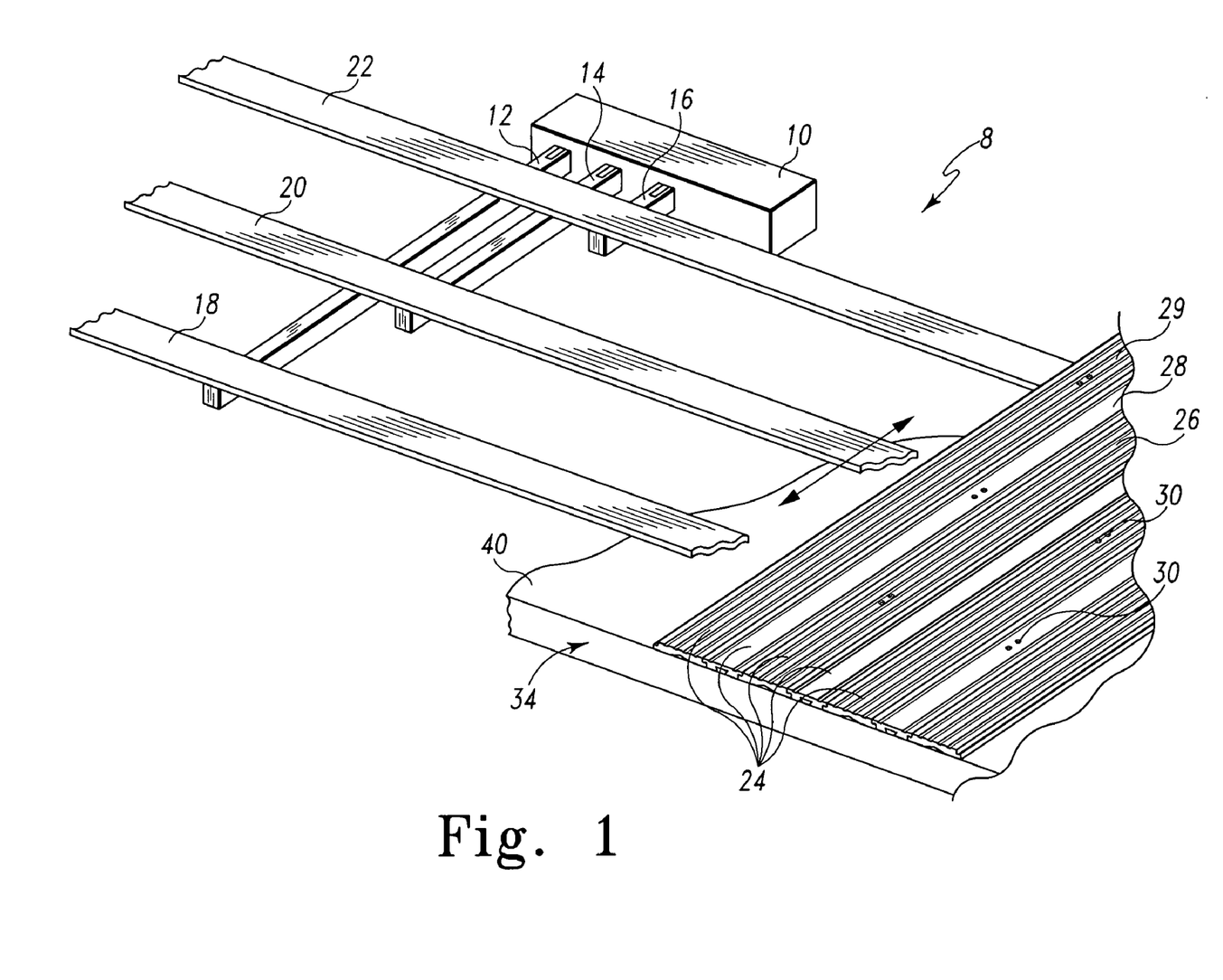
FIG. 1 is a fragmentary perspective view of a portion of a live floor showing the reinforced slats connected to the drive beams of a drive system.

Referring now to FIG. 1, one embodiment is shown of a reciprocating floor 8 that includes a drive 10, a number of drive links 12, 14, 16, a number of drive beams 18, 20, 22, and a number of slats 24. Drive links 12, 14, 16 are coupled to drive 10. The drive beam 18 is coupled to the drive link 12. Similarly, the drive beam 20 is coupled to the drive link 14. The drive beam 22 is secured to the drive link 16. The slats 24 are secured to the drive beams 18, 20, 22 in a manner which facilitates a designated movement pattern. For example, one of the slats 24, designated with reference number 26, is secured to the drive beam 18. One of the slats 24, designated with reference number 28, is secured to the drive beam 20. Likewise, another one of the slats 24, designated with reference number 29, is secured to the drive beam 18. This results in the motion of the drive link 12 being translated to motion of the slat 26, motion of the drive link 14 being translated to motion of the slat 28, and motion of the drive link 16 being translated to motion of the slat 29.

A predetermined sequence of translational movements of the slats 24 may be utilized to move cargo, for example, in a truck, trailer, or warehouse. In the exemplary embodiment of the reciprocating floor 8 described herein, the drive links 12, 14, 16 are independently driven by three independent hydraulic cylinders (not shown) which are powered by the drive 10. It should be appreciated that the drive links 12, 14, 16 may be embodied with any number of hydraulic cylinders for driving any number of the drive beams 18, 20, 22 with the embodiment described herein being exemplary in nature. It should be understood that while the illustrative embodiment shows the drive system embodied as a hydraulic system, any of a number of mechanisms may be employed to move the slats 24.

Illustratively, the slats 24 are secured to the respective drive beams 18, 20, 22 by a fastener 30. In an exemplary embodiment, the fastener 30 is a bolt which is retained by a nut 32 (seen best in FIG. 5) on the underside of the drive beams 18, 20, 22. In addition to a bolt and nut assembly, the fastener 30 may be embodied as a screw, a pin, a rivet or the like. In this illustrative embodiment, two fasteners 30 are used. In other embodiments, a different number of fasteners may be used and may be located in any number of different locations on the slats 24.

Figure 2:
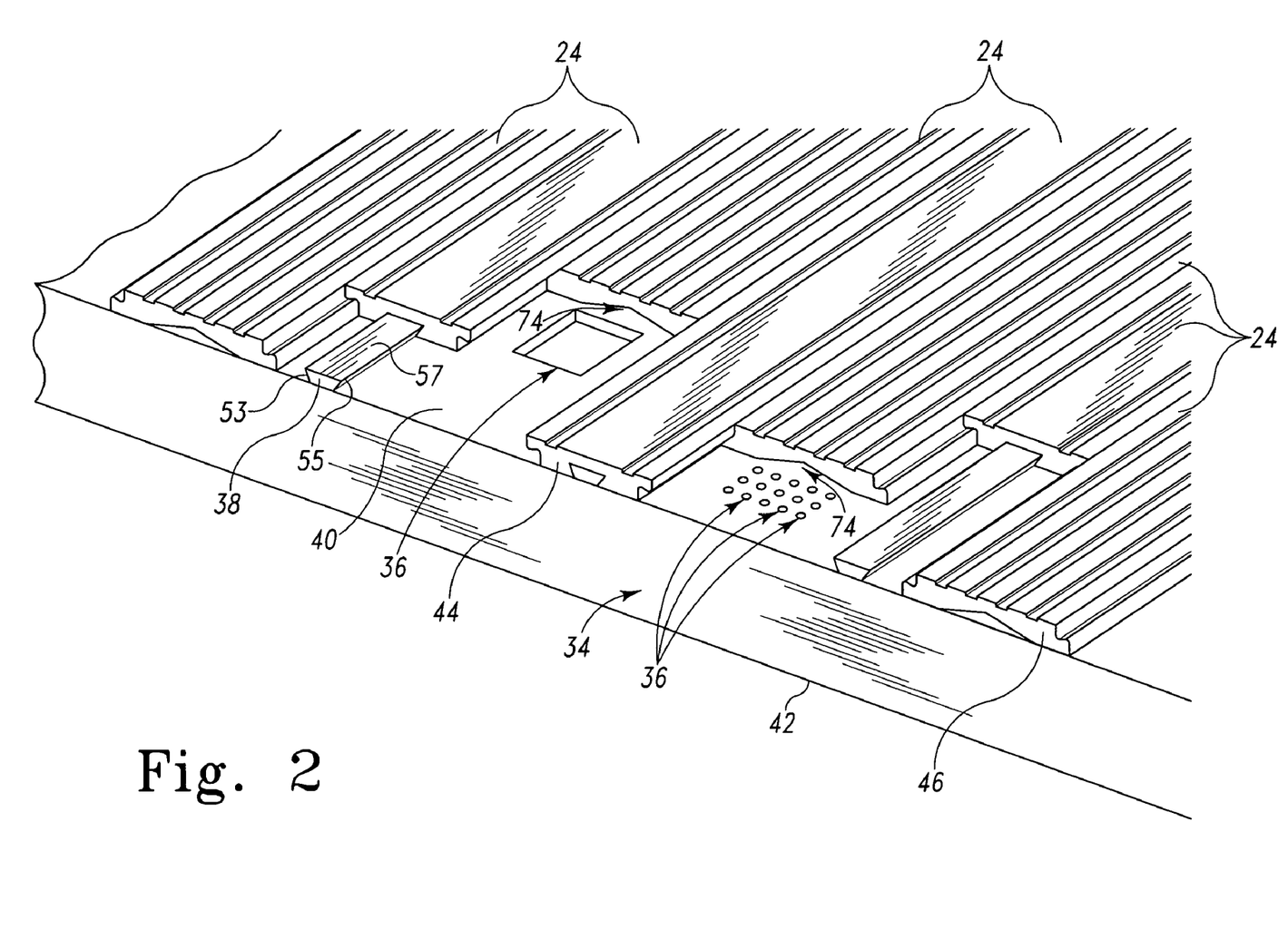
FIG. 2 is an enlarged fragmentary perspective view showing the reinforced slats on a base having holes leading to a sump.

As shown in FIG. 2, the slats 24 are positioned on a base 34 having a generally flat upper surface 40 and a lower surface 42. Located on the upper surface 40 is a plurality of guides 38 which are secured to the base 34. It should be appreciated that the guides 38 may be embodied as separate components secured to the base 34 or may be integrally formed with the base 34. The guides 38 extend the longitudinal length of the base 34, and are substantially parallel to one another. The guides 38 may extend the entire longitudinal length of the base 34 or may be intermittently spaced along the length of the base 34 depending on structural requirements.

As shown in FIG. 2, in the exemplary embodiment described herein, the slats 24 may take on two different forms. In particular, a first type of slat (hereinafter referred to as a "retaining slat 44") translates along the guides 38. The retaining slats 44 retain a second type of slat (hereinafter referred to as a "retained slat 46") on the base 34. The retaining slats 44 are free to move in a longitudinal direction relative to the base 34 and the guides 38. The retained slats 46 intermesh or otherwise mate with the retaining slats 44 such that the retained slats 46 are free to move in a longitudinal direction, but are retained against the upper surface 40 by the retaining slats 46. The retained slats 46 move relative to the base 34 and independently of the retaining slats 44.

Figure 3:
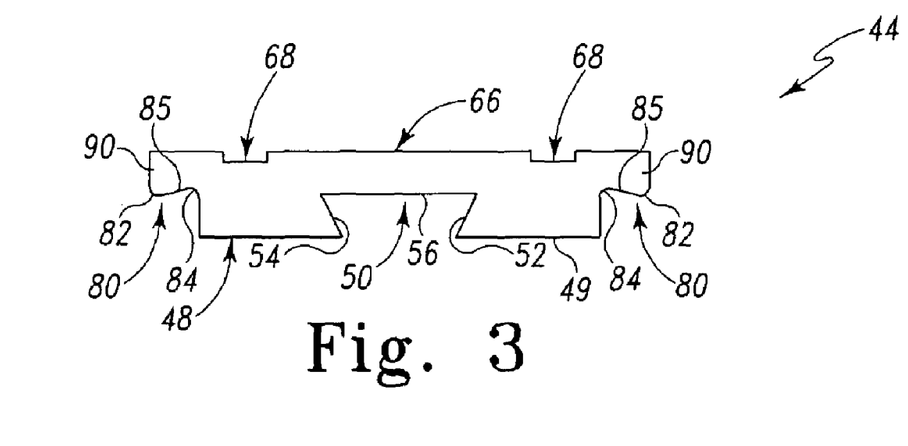
FIG. 3 is an end view of an illustrative embodiment of a reinforced slat.

As shown in FIG. 3, the retaining slat 44 has a pair of lower surfaces 48, 49 which are generally flat. Centered between the lower surfaces 48, 49 is a groove 50 into which the guide 38 is received. In the illustrative embodiment of FIG. 3, the groove 50 and the guide 38 define a sliding dovetail joint. Specifically, as shown in FIG. 3, a pair of inwardly angled surfaces 52, 54 and an upper surface 56, which is parallel to the lower surface 48 of retaining slat 44, forms the groove 50. The guide 38 has a number of corresponding surfaces, namely outwardly angled surfaces 53, 55 and an upper surface 57 (see FIG. 2). The groove 50 is sized to allow the retaining slat 44 to slide freely on the guide 38.

The body of the retaining slat 44 has a pair of flanges 90 extending outwardly therefrom. The flanges 90 have a lower surface profile 80 which facilitates engagement of a complementary profile of the retained slat 46. In particular, the flanges 90 have a profile 80 on the underside thereof which engages the complementary profile of the pair of flanges 76 of the retained slat 46. In the exemplary embodiment described herein, the profile 80 includes a pair of opposing radiused surfaces 82, 84 separated by angled surface 85. As described below in greater detail, the retained slat 46 inlcudes a pair of flanges 76 having complementary profiles 79 formed therein. When assembled, the flanges 90 intermesh or otherwise mate with the flanges 76. As a result, the retaining slat 44 limits the side to side and vertical movement of the retained slat 46. However, such a configuration allows the retaining slat 44 and the retained slat 46 to move freely in the longitudinal direction without lifting from the base 34.

The retaining slat 44 has a number of channels 68 defined in an upper surface 66 thereof. The channels 68 reduce the surface contact with the load and provide a path for fluid to flow along the length of the retaining slat 44 below the surface 66 to reduce the contact of the fluid with the load positioned on the retaining slat 44.

Figure 4:
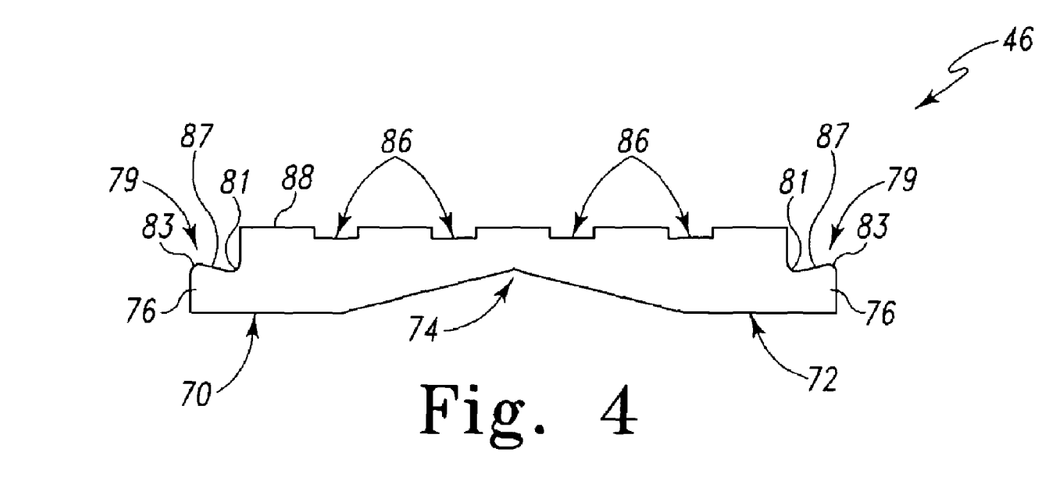
FIG. 4 is an end view of another illustrative embodiment of a reinforced slat.

Referring now to FIG. 4, the retained slat 46 has a pair of lower surfaces 70, 72 which are generally flat. A channel 74 is positioned between the lower surfaces 70, 72. The channel 74 is defined by a pair of intersecting angular surfaces. This channel 74 extends along the longitudinal length of the retained slat 46, and, as a result, reduces the surface area of the slat 46 that is in contact with the base 34. Fluid trapped between the slat 46 and the base 34 may be advanced through the channel 74. Although the channel 74 is shown in FIG. 4 as having a generally triangular cross-sectional shape, other configurations may be used. For example, the channel 74 may be embodied with a generally arched or rectangular cross sectional shape. It should be recognized that any number of other configurations of the channel 74 may be used. In some embodiments, the channel 74 may be omitted such that a single generally flat lower surface may be supported on the upper surface 40 of base 34.

The body of the retained slat 46 has a pair of flanges 76 extending outwardly therefrom. The flanges 76 have an upper surface profile 79 which facilitates engagement of a complementary profile of the retaining slat 44 as described above. In particular, the flanges 76 have a profile 79 on the topside thereof which engages the complementary profile of the pair of flanges 90 of the retaining slat 44. In the exemplary embodiment described herein, the profile 79 includes a pair of opposing radiused surfaces 81, 83 separated by angled surface 87.

The upper surface 88 of the retained slat 46 has a number of channels 86 defined therein. As with the channels 68 of the retaining slat 44, the channels 86 manage the amount of surface contact between the retained slat 46 and the a load and form a flow path for fluid that is below the upper surface 88 thereby reducing contact of the fluid with the load positioned on the retained slat 46.

While a specific embodiment of the flanges 90, 76 having a surface profiles 80, 79 is shown in FIGS. 3 and 4, it is contemplated that the retaining slat 44 and the retained slat 46 may be embodied with other designs of complementary surfaces. For example, the retaining slat 44 and the retained slat 46 may be configured to mate in a sliding tongue and groove joint.

Figure 6:
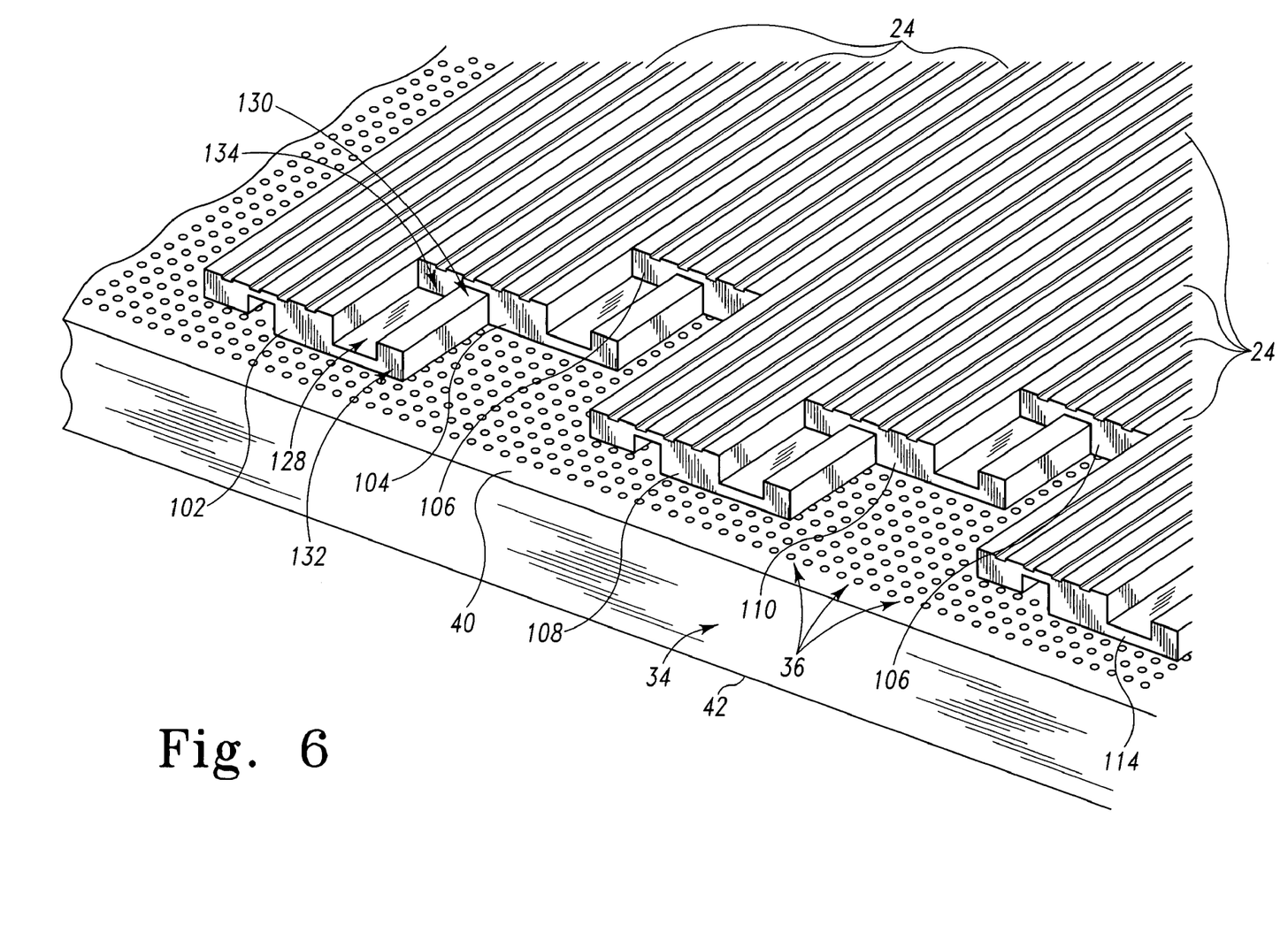
FIG. 6 is an enlarged fragmentary perspective view showing another embodiment of reinforced slats on a base having holes leading to a sump.
Figure 7:
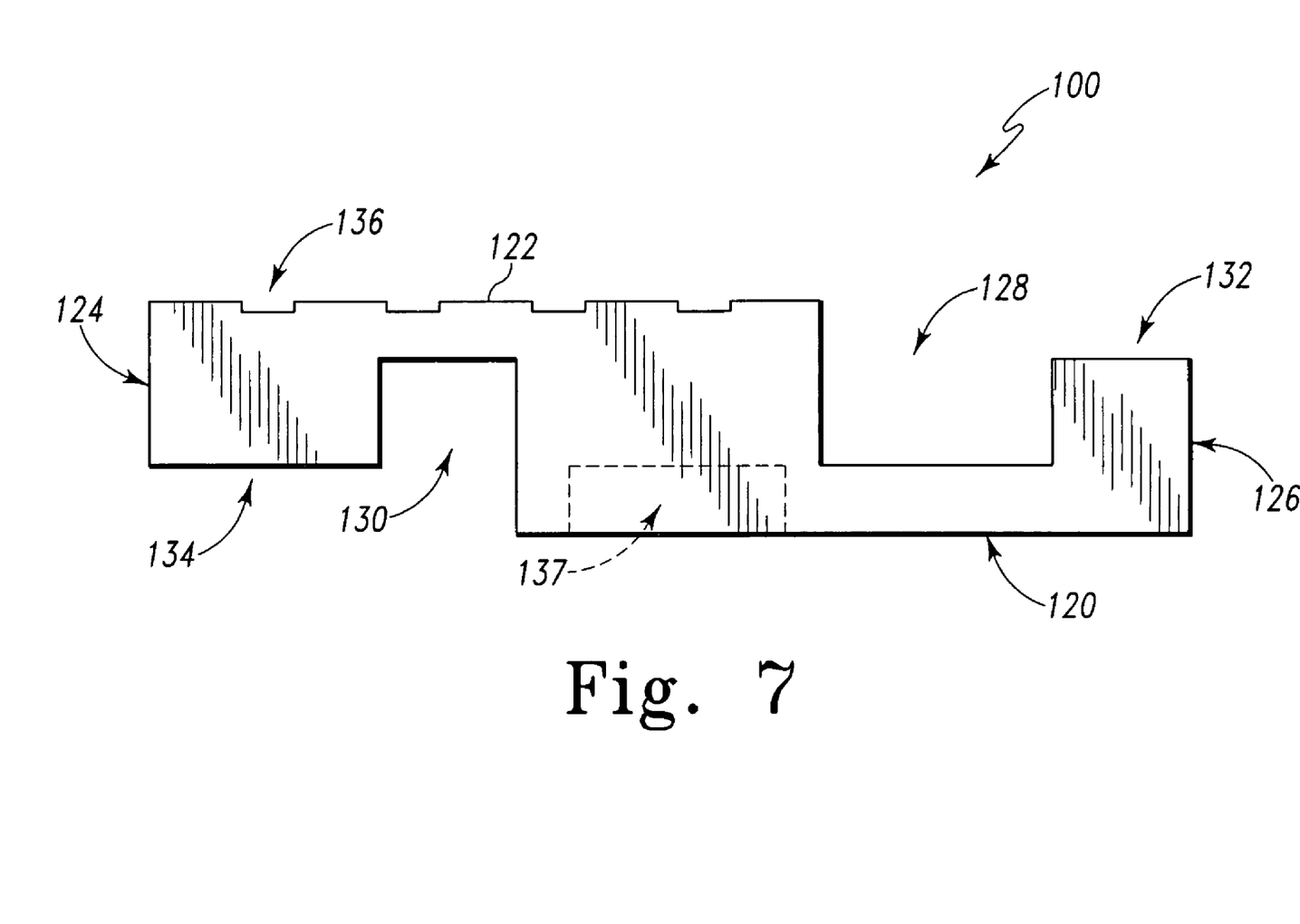
FIG. 7 is an end view of yet another embodiment of a reinforced slat.

In another embodiment of the reciprocating floor 8 is shown in FIGS. 6 and 7, each of the slats 24 has a similar cross-sectional shape. The illustrative embodiment of slats 24 shown in FIGS. 6 and 7 will hereinafter be referred to as "sliding slat 100." Referring now to FIG. 7, the sliding slat 100 has a lower surface 120, an upper surface 122, and sides 124, 126. Sliding slat 100 also has an upwardly facing channel 128, a downwardly facing channel 130, an upwardly extending retainer 132, and a downwardly extending retainer 134. Located on upper surface 122 are several smaller channels 136. The upwardly facing channel 128 is sized to mate with the downwardly extending retainer 134 of an adjacent sliding slat 100. Likewise, the downwardly facing channel 130 is sized to mate with the upwardly extending retainer 132 of an adjacent sliding slat 100. When mated, the channels 128, 130 and retainers 132, 134 are sized allow free movement of one sliding slat 100 relative to another sliding slat 100. In some embodiments, the sliding slat 100 may further include a channel 137 formed in the lower surface 120 as shown in phantom in FIG. 7. When present, the channel 137 reduced the amount of surface contact between lower surface 120 and the upper surface 40 of the base 34. Additionally, channel 137 permits the flow of fluid or other materials beneath sliding slat 100.

The channels 136 provide a path for fluid to flow along the length of the sliding slat 100 below the surface 122 to reduce the contact area between the sliding slat 100 and a load and permit flow of fluid on the sliding slat 100.

Referring now to FIG. 6, the sliding slats 100 are positioned on the upper surface 40 of base 34. The sliding slats 100 are free to move in a longitudinal direction relative to the base 34. The sliding slats 100 intermesh or otherwise mate with one another as described above. Each sliding slat 100 mates with an adjacent sliding slat 100 such that the sliding slats 100 retain one another. Illustratively, the sliding slats 100 in FIG. 6 have been numbered 102, 104, 106, 108, 110, 112, and 114 in FIG. 6. As can be seen, for example, downwardly extending retainer 134 and the downwardly facing channel 130 of the slat 104 intermesh or otherwise mate with the upwardly facing channel 128 and the upwardly extending retainer 132, respectively, of the slat 102. The slats 106, 108, 110, 112, 114 are similarly mated, as shown in FIG. 6. The sliding slats 100 are moved in a manner similar to the sliding slats described in the illustrative embodiment of FIG. 2.

The slats 44, 46, 100 have a constant cross-sectional shape throughout their longitudinal length. This constant cross-sectional shape facilitates production of the slats 44, 46, 100 by allowing the slats 44, 46, 100 to be produced with a high volume process such as extrusion or pultrusion.

These illustrative embodiments are provided as examples and it should be understood numerous other configurations may be used. The shapes of the slats 44, 46, 100 as shown in the figures are exemplary in nature and numerous other shapes may be designed to suit specific material handling and frictional requirements. The sliding dovetail feature and overlapping design of the slats 44, 46, 100 using guides 38 on alternate slats is representative. For certain applications, the guides 38 may be used on all slats and the dovetail feature may not be necessary. On still other embodiments, there may be no dovetailing feature.

In some embodiments, the slats 44, 46, 100 may have transverse grooves, a roughened surface, or other surface finish to transfer frictional forces between the slats 44, 46, 100 and material being conveyed.

The slats 44, 46, 100 may be made of an ultrahigh molecular weight material such as ultra high molecular weight polyethylene (UHMWPE). The slats 44, 46, 100 may be produced with self lubricating properties by impregnating lubricants into the material which are then released through wear of the material. The slats 44, 46, 100 may also be produced from composite materials or from a metal such as aluminum. Any material of sufficient strength and wear characteristics may be used to produce the slats 44, 46, 100 and this disclosure should not be construed to be limited to the illustrative materials discussed herein.

Referring again to FIG. 2, the base 34 has a plurality of holes 36 defined therein. The holes 36 provide a path for fluid to flow through the base 34 from the upper surface 40. Exemplarily, the holes 36 are positioned under the channels 74. As can be seen in FIG. 2, the holes 36 may be of various sizes. The size, shape and location of the holes 36 may be varied to accommodate the flow of fluid or other matter off of the reciprocating floor as necessary in a particular installation of the reciprocating floor 8. In the exemplary embodiment of FIG. 2, the holes 36 are positioned such that they are not positioned immediately below the lower surfaces 70, 72 of the retained slats 46. This approach may be used to reduce wear on the lower surfaces 70, 72. However, as can be seen in the exemplary embodiment of FIG. 6, holes 36 may be located on base 34 such that they are throughout the area of contact between the slats 24 and the base 34. The presence or absence of holes 36 may vary depending on the application and nature of cargo to be moved.

Figure 5:
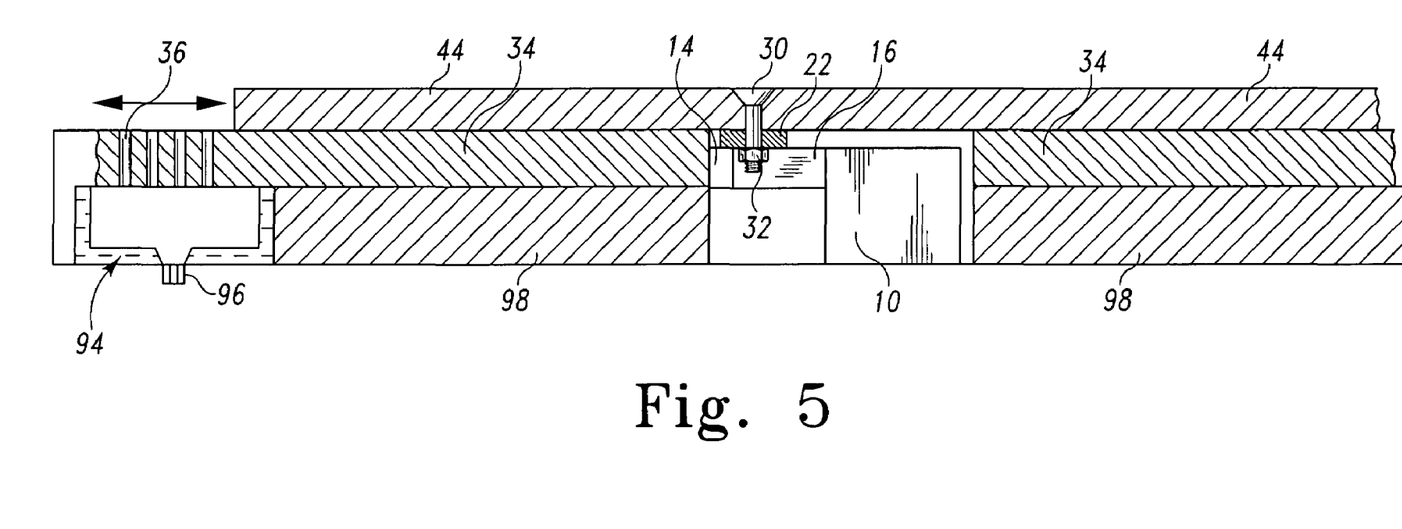
FIG. 5 is a fragmentary cross-sectional view of a truck bed having a live floor with portions cut away.

As shown in FIG. 5, a collector may be placed under the base 34 to collect fluids passing through the holes 36. For example, a sump tank 94 may be placed under the base 34 with the sump tank 94 having a closeable drain 96 at the bottom thereof. The sump tank 94 is exemplarily shown secured near the back of the chassis 98 of a truck. In other embodiments, the sump may be placed at the front or middle of the chassis 98 of a truck or near the drive mechanism 10 on the chassis 98 of a truck. In some embodiments, the sump tank 94 may be omitted and fluid may pass through the holes 36 to a floor drain or some other apparatus capable of conveying the fluid away from the base 34.

The base 34 may be embodied as one or more high strength composite panels. One exemplary type of composite panel is a fiber reinforced polymer (FRP) panel. Such an FRP panel may be formed of a polymer matrix composite material which includes a reinforcing agent and a polymer resin. The FRP panel may be embodied as any type of FRP structure. Examples of such structures include, but are not limited to, a solid laminate, a sandwich panel (e.g., a panel having upper and lower skins with a core therebetween), a pultruded panel, or a panel having upper and lower skins with vertical or diagonal webs therebetween.

The matrix may include a thermosetting resin, although thermoplastic resins are also contemplated for use. Examples of thermosetting resins which may be used include, but are not limited to, unsaturated polyesters, vinyl esters, polyurethanes, epoxies, phenolics, and mixtures and blends thereof.

The reinforcing agent may include E-glass fibers, although other reinforcements such as S-glass, carbon, Kevlar, metal, high modulus organic fibers (e.g. aromatic polyamides, polybenzamidazoles, and aromatic polyimides), and other organic fibers (e.g. polyethylene and nylon) may be used. Blends and hybrids of the various reinforcing materials may be used. Other suitable composite materials may be utilized including whiskers and fibers such as boron, aluminum silicate, and basalt.

In the case of where the FRP panel is embodied as a sandwich panel, the core type may include, but is not limited to, balsa wood, foam and various types of honeycomb.

The FRP panel may be embodied as any of the structures disclosed in U.S. Pat. Nos. 5,794,402; 6,023,806; 6,044,607; 6,070,378; 6,081,955; 6,108,998; 6,467,118 B2; 6,645,333; 6,676,785, the entirety of each of which is hereby incorporated by reference. It should be appreciated that the structures disclosed in the above-identified patents may be sized, scaled, dimensioned, orientated, or otherwise configured in any desired manner to fit the needs of a given design of the FRP panel.

In addition to composite materials, it is contemplated that other materials may be used in the construction of the base 34. The base 34 may be constructed from wood, metal, concrete or other material suitable for supporting the load borne by the reciprocating floor 8.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. A reciprocating floor, comprising:
   a driver,
   a substantially continuous planar surface,
   a first slat comprising an upper surface and a lower surface, the first slat secured to the driver, and
   a second slat comprising an upper surface and a lower surface, the second slat secured to the driver and positioned alongside the first slat such that the first and second slats intermesh with one another along their longitudinal axes and are moveable along their longitudinal axes relative to one another in response to operation of the driver,
   wherein the lower surfaces of the slats contact the substantially continuous planar surface such that the slats distribute a load supported on the slats to the surface.

2. The reciprocating floor of claim 1, wherein the driver comprises
   a first drive link coupled to the first slat, the first drive link configured to reciprocate the first slat along the longitudinal axis of the first slat between a first position and a second position, and
   a second drive link coupled to the second slat, the second drive link configured to reciprocate the second slat along the longitudinal axis of the second slat between a first position and a second position independently of the first slat.

3. The reciprocating floor of claim 1, wherein the first slat or the second slat further comprises a channel formed along the longitudinal axis of that slat in lower surface thereof.

4. The reciprocating floor of claim 1, wherein the first slat or the second slat further comprises a channel formed along the longitudinal axis of that slat in upper surface thereof.

5. The reciprocating floor of claim 1, wherein the first slat or the second slat comprises an ultra high molecular weight material.

6. A reciprocating floor, comprising:
   a base comprising an upwardly facing surface,
   a longitudinal guide on the upwardly facing surface of the base forming a longitudinal reciprocation axis,
   a first slat comprising an upper surface and a lower surface, the lower surface engaged with the guide, the guide retaining the lower surface of the first slat in contact with the upwardly facing surface of the base, the first slat free to move along the longitudinal reciprocation axis, and
   a second slat comprising an upper surface and a lower surface, adjacent to and engaged with the first slat such that the first slat retains the lower surface of the second slat in contact with the upwardly facing surface of the base, the second slat free to move relative to the first slat and the base, parallel to the longitudinal reciprocation axis.

7. The reciprocating floor of claim 6, further comprising
   a first drive link coupled to the first slat, the first drive link configured to reciprocate the first slat along a longitudinal axis of the first slat between a first position and a second position, and
   a second drive link coupled to the second slat, the second drive link configured to reciprocate the second slat along a longitudinal axis of the second slat between a first position and a second position independently of the first slat.

8. The reciprocating floor of claim 7, wherein the first drive link or the second drive link comprise a hydraulic cylinder.

9. The reciprocating floor of claim 6, wherein the base comprises a plurality of apertures in the upwardly facing surface, the apertures configured to communicate matter away from the upwardly facing surface.

10. The reciprocating floor of claim 9, wherein the second slat further comprises a channel formed in lower surface engaging the upwardly facing surface of the base, the channel configured to direct matter to the plurality of apertures in the upwardly facing surface of the base.

11. The reciprocating floor of claim 9, wherein the floor further comprises a reservoir below the base, the apertures in the upwardly facing surface of the base configured to communicate matter to the reservoir.

12. The reciprocating floor of claim 11, wherein the reservoir comprises a drain.

13. The reciprocating floor of claim 12, wherein the drain is remotely controlled.

14. The reciprocating floor of claim 6, wherein the base is supported on the chassis of a truck.

15. The reciprocating floor of claim 6, wherein the base comprises a fiber reinforced polymer panel.

16. The reciprocating floor of claim 6, wherein the first slat or the second slat further comprises a channel formed along a longitudinal axis of the slat in upper surface of the slat.

17. A slat for a reciprocating floor, comprising:
   a lateral cross-section, the cross-section including a first lateral side comprising an upwardly extending protrusion and an upwardly open channel inboard the upwardly extending protrusion, and a second lateral side having a downwardly extending protrusion and a downwardly open channel inboard the downwardly extending protrusion wherein the first lateral side and the second lateral side are configured to intermesh with adjacent slats of the reciprocating floor such that the upwardly extending protrusion contacts the downwardly open channel of an adjacent slat and the downwardly extending protrusion contacts the upwardly open channel of an adjacent slat while allowing free longitudinal movement relative thereto.

18. The slat of claim 17, further comprising a channel formed in a lower portion of the cross-section.

19. The slat of claim 17, further comprising a channel formed in an upwardly facing portion of the cross-section.

20. The slat of claim 17, wherein the slat comprises an ultra high molecular weight material.

* * * * *